(12) United States Patent
Chang

(10) Patent No.: US 8,836,661 B2
(45) Date of Patent: Sep. 16, 2014

(54) ELECTRONIC DEVICE AND METHOD FOR OPERATING TOUCH PANEL THEREOF

(75) Inventor: Yu-Min Chang, New Taipei (TW)

(73) Assignee: Acer Incorporated, New Taipei (TW)

( * ) Notice: Subject to any disclaimer, the term of this patent is extended or adjusted under 35 U.S.C. 154(b) by 163 days.

(21) Appl. No.: 13/532,790

(22) Filed: Jun. 26, 2012

(65) Prior Publication Data

US 2013/0257756 A1     Oct. 3, 2013

(30) Foreign Application Priority Data

Mar. 29, 2012    (TW) .............................. 101111127 A (51) Int. Cl.
*G06F 3/041* (2006.01)
*G06K 11/06* (2006.01)
*G08C 21/00* (2006.01)

(52) U.S. Cl.
USPC ........................................ 345/173; 178/18.03

(58) Field of Classification Search
CPC .............................. G06F 3/0488; G08C 21/00
USPC ........................................ 345/173; 178/18.03
See application file for complete search history.

(56) References Cited

U.S. PATENT DOCUMENTS

| | | | | |
|---|---|---|---|---|
| 6,124,850 A | * | 9/2000 | Matsubara | 345/204 |
| 2009/0315876 A1 | * | 12/2009 | Ichikawa et al. | 345/213 |
| 2012/0146928 A1 | * | 6/2012 | Lee | 345/173 |
| 2012/0208639 A1 | * | 8/2012 | Reynolds et al. | 463/36 |

FOREIGN PATENT DOCUMENTS

| | | |
|---|---|---|
| CN | 102043518 | 5/2011 |
| CN | 102221927 | 10/2011 |

* cited by examiner

*Primary Examiner* — Aneeta Yodichkas
(74) *Attorney, Agent, or Firm* — Jianq Chyun IP Office (57) ABSTRACT

An electronic device and a method for operating a touch panel of the electronic device are provided. The electronic device includes a touch panel, a driving unit and a processing unit. The driving unit is coupled to the touch panel, and drives the touch panel through a scanning frequency. The processing unit is coupled to the driving unit. When a peripheral component of the electronic device is enabled or connected to the electronic device, the processing unit looks up a working frequency table according to character information of the peripheral component, so as to obtain frequency information of the peripheral component, and determines whether or not to change the scanning frequency of the driving unit according to the frequency information of the peripheral component.

12 Claims, 4 Drawing Sheets

ELECTRONIC DEVICE AND METHOD FOR OPERATING TOUCH PANEL THEREOF

CROSS-REFERENCE TO RELATED APPLICATION

This application claims the priority benefit of Taiwan application serial no. 101111127, filed on Mar. 29, 2012. The entirety of the above-mentioned patent application is hereby incorporated by reference herein and made a part of this specification.

BACKGROUND

1. Technical Field

The invention relates to a method for selecting a scanning frequency. Particularly, the invention relates to a method for selecting a scanning frequency for a touch panel and an electronic device using the same.

2. Related Art

As technology advances, touch panels gradually replace conventional keyboard input devices. Namely, more and more information products can receive operation commands through the touch panels. Generally, in order to provide power required for operating the information product or make the information product to support more levels of application, the information product is generally connected to other external devices, for example, a mobile phone can be connected to a charger for charging. Therefore, when the information product having a touch panel (which is simply referred to as the information product) is connected to the external device, a scanning frequency used to scan the touch panel of the information product is probably interfered by a working frequency of the connected external device. Now, due to the interference of the working frequency of the external device, a plenty of noises are generated in sensing results of the touch panel, which influences the performance of the touch panel.

According to the conventional technique, a high voltage or frequency hopping operation method is used to enhance the performance of the touch panel. The conventional frequency hopping operation is blindly and gradually decrease (or increase) the scanning frequency for the touch panel from a predetermined working frequency in a method non-related to the connected external device (peripheral component) until the performance of the touch panel reaches an acceptable range.

However, the above conventional frequency hopping operation method needs to spend a lot of time in blindly trying to find a better scanning frequency.

SUMMARY

Accordingly, the invention is directed to an electronic device and a method for operating a touch panel thereof, by which a scanning frequency of the touch panel that is not interfered by a peripheral device is quickly found.

The invention provides an electronic device including a touch panel, a driving unit and a processing unit. The driving unit is coupled to the touch panel, and drives the touch panel through a scanning frequency, so as to read touch coordinates of the touch panel. The processing unit is coupled to the driving unit, where when a peripheral component of the electronic device is enabled or connected to the electronic device, the processing unit looks up a working frequency table according to characteristic information of the peripheral component, so as to obtain frequency information of the peripheral component, and determines whether or not to change the scanning frequency of the driving unit according to the frequency information of the peripheral component.

The invention provides a method for operating a touch panel of an electronic device. According to the method, a driving unit drives a touch panel through a scanning frequency, so as to read touch coordinates of the touch panel. When a peripheral component of the electronic device is enabled or connected to the electronic device, a working frequency table is looked up according to characteristic information of the peripheral component, so as to obtain frequency information of the peripheral component. It is determined whether or not to change the scanning frequency of the driving unit according to the frequency information of the peripheral component.

In an embodiment of the invention, the driving unit determines the scanning frequency according to a working frequency setting, and the processing unit determines whether or not to change the working frequency setting of the driving unit according to the frequency information of the peripheral component.

In an embodiment of the invention, when the peripheral component is disabled or unplugged, the processing unit recovers the working frequency setting to an initial default value.

In an embodiment of the invention, when the scanning frequency of the driving unit conflicts with the frequency information of the peripheral component, the processing unit changes the scanning frequency of the driving unit.

In an embodiment of the invention, the peripheral component includes a charger or a high-definition multimedia interface (HDMI) component.

In an embodiment of the invention, when the characteristic information of the peripheral component is not recorded in the working frequency table, and the scanning frequency of the driving unit is interfered by the peripheral component, the processing unit changes the scanning frequency of the driving unit through a frequency hopping operation to find a frequency band that is not interfered by the peripheral component, and records the characteristic information of the peripheral component in the working frequency table.

According to the above descriptions, the invention provides an electronic device and a method for operating a touch panel thereof, by which a scanning frequency of the touch panel that is not interfered by the peripheral device is quickly found through the working frequency table.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
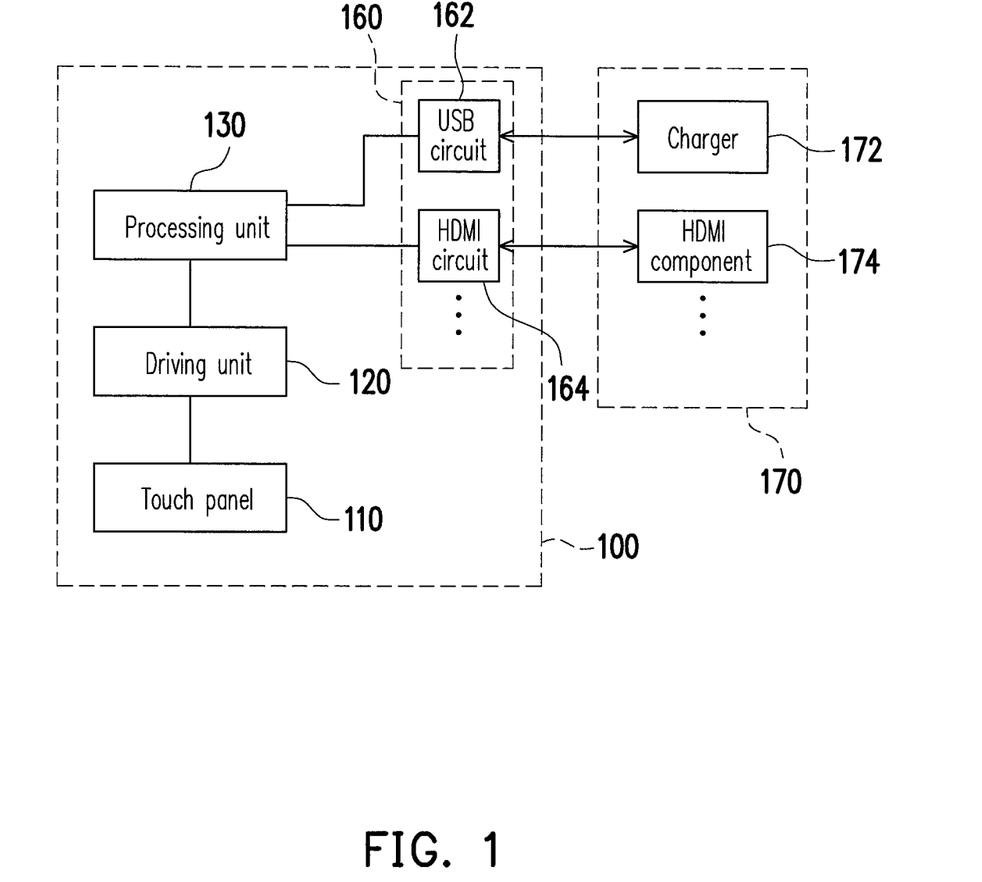
FIG. 1 is a functional block schematic diagram of an electronic device according to an exemplary embodiment of the invention.

FIG. 1 is a functional block schematic diagram of an electronic device according to an exemplary embodiment of the invention. Referring to FIG. 1, the electronic device 100 includes a touch panel 110, a driving unit 120 and a processing unit 130. In the present exemplary embodiment, the electronic device 100 can be any information product, for example, a mobile phone, a personal digital assistant (PDA), a smart phone, an electronic book, a game machine, a flat panel computer or a personal computer, etc., which is not limited by the invention.

The touch panel 110 is used to receive operation commands from a user, for example, the touch panel 110 detects an input command of the user, and enables the electronic device 100 to perform a corresponding operation. In the present exemplary embodiment, the touch panel 110 can be a resistive touch panel, a capacitive touch panel, an optical touch panel, an infrared touch panel or an electromagnetic touch panel, which is not limited by the invention.

The driving unit 120 is coupled to the touch panel 110. The driving unit 120 drives the touch panel 110 through a scanning frequency, so as to read touch coordinates of the touch panel 110. In detail, the driving unit 120 can continually scan/drive the touch panel 110 through a specific scanning frequency, so that when the user touches the touch panel 110, the driving unit 120 can immediately read a touch signal corresponding to a touch position on the touch panel 110, and converts the touch signal into information related to the touch position, for example, the touch coordinates.

The processing unit 130 is coupled to the driving unit 120. In the present exemplary embodiment, the processing unit 130 can be a central processing unit, a keyboard controller, a micro-controller or a control chipset, etc., which is not limited by the invention. A peripheral component 170 includes a charger 172, a high-definition multimedia interface (HDMI) component 174 or other peripheral components. The peripheral component 170 is coupled to the processing unit 130 through a corresponding interface circuit 160. For example, the charger 172 is connected to the electronic device 100 through a universal serial bus (USB) circuit 162 for providing operating and charging power of the electronic device 100. For another example, the electronic device 100 can transmit an HDMI image to the HDMI component 174 through an HDMI circuit 164. In other embodiments, the peripheral component 170 can be a mouse, a keyboard or other peripheral devices.

When the peripheral component 170 is connected to the electronic device 100 or the peripheral component 170 of the electronic device 100 is enabled, the processing unit 130 can obtain characteristic information of the peripheral component 170 through the interface circuit 160, for example, brand, model number, device category or other information. For example, the processing unit 130 can obtain the brand, model number, device category or other information of the charger 172 through the USB circuit 162.

In the present embodiment, the scanning frequency of the driving unit 120 is dynamically adjusted along with an operation state of the electronic device 100. The processing unit 130 has a working frequency table. When the peripheral component 170 is coupled to or electrically connected to the electronic device 100 or the peripheral component 170 of the electronic device 100 is enabled, for example, when the charger 172 or the HDMI component 174 is electrically connected to the electronic device 100, the processing unit 130 can obtain the characteristic information of the peripheral component 170, for example, the brand, model number, device category or other information. The processing unit 130 can look up the working frequency table according to the characteristic information of the peripheral component 170, so as to obtain frequency information of the peripheral component 170. The processing unit 130 determines whether or not to change the scanning frequency of the driving unit 120 according to the frequency information of the peripheral component 170. Therefore, when the driving unit 120 scans/drives the touch panel 110, driving unit 120 avoids to use the scanning frequency interfered by the peripheral component 170, so as to reduce the interference noise from the peripheral component 170.

In an exemplary embodiment of the invention, the driving unit 120 has a memory for recording a working frequency setting of the touch panel 110. The driving unit 120 determines the scanning frequency used for driving the touch panel 110 according to the working frequency setting. In the present embodiment, the working frequency setting can be at least one frequency value. For example, the working frequency setting recorded in the memory of the driving unit 120 includes an initial default value and a current working frequency value. In an initial state, the current working frequency value is set to the initial default value, and the driving unit 120 determines the scanning frequency used for driving the touch panel 110 according to the initial default value.

When the peripheral component 170 is coupled to the electronic device 100 or the peripheral component 170 of the electronic device 100 is enabled, the processing unit 130 looks up the working frequency table to obtain the frequency information of the peripheral component 170, and determines whether or not to change the current working frequency value of the working frequency setting of the driving unit 120 according to the frequency information of the peripheral component 170. After the current working frequency value of the driving unit 120 is changed, the driving unit 120 correspondingly changes the scanning frequency used for driving the touch panel 110 according to the new current working frequency value. For example, when the scanning frequency of the driving unit 120 used for driving the touch panel 110 conflicts with the frequency information of the peripheral component 170, the processing unit 130 changes the scanning frequency of the driving unit 120 used for driving the touch panel 110, so as to avoid the conflicted frequency range of the peripheral component 170. When the peripheral component 170 is disabled or unplugged, the processing unit 130 recovers the working frequency setting (the current working frequency value) of the driving unit 120 to the initial default value.

In the present exemplary embodiment, the driving unit 120 can be a panel driving circuit, a panel driving chip or a touch panel controller, etc., which is not limited by the invention.

When the peripheral component 170 of the electronic device 100 is enabled or is connected to the electronic device 100, the processing unit 130 looks up the working frequency table according to the characteristic information of the peripheral component 170 to obtain the frequency information of the peripheral component 170. The characteristic information of the peripheral component 170 relates to a component characteristic of the peripheral component 170 itself, for example, a working frequency of the peripheral component 170. In the present embodiment, when the electronic device 100 is manufactured, the working frequency table has been already recorded in the electronic device 100 (for example, recorded in the processing unit 130), though the invention is not limited thereto, and in other embodiments, when the electronic device 100 is manufactured, a content of the working frequency table can be blank.

During a process that the processing unit 130 looks up the working frequency table, if it is discovered that the characteristic information of a certain peripheral component 170 (for example, HDMI component 174) is not recorded in the working frequency table in advance, and when the scanning frequency of the driving unit 120 used for driving the touch panel 110 is interfered by the new peripheral component 170, the processing unit 130 changes the scanning frequency of the driving unit 120 used for driving the touch panel 110 through a frequency hopping operation, so as to find a frequency band that is not interfered by the new peripheral component 170. After the processing unit 130 finds the frequency band that is not interfered by the peripheral component 170 through the frequency hopping operation, it records the characteristic information of the peripheral component 170 and the interfered frequency band in the working frequency table. Now, the processing unit 130 already "knows" the new peripheral component 170. When the peripheral component 170 (for example, the HDMI component 174) is again enabled or connected to the electronic device 100 for a next time, the processing unit 130 can quickly determine whether or not to change the scanning frequency of the driving unit 120 without performing the conventional time-consuming frequency hopping operation.

Figure 2:
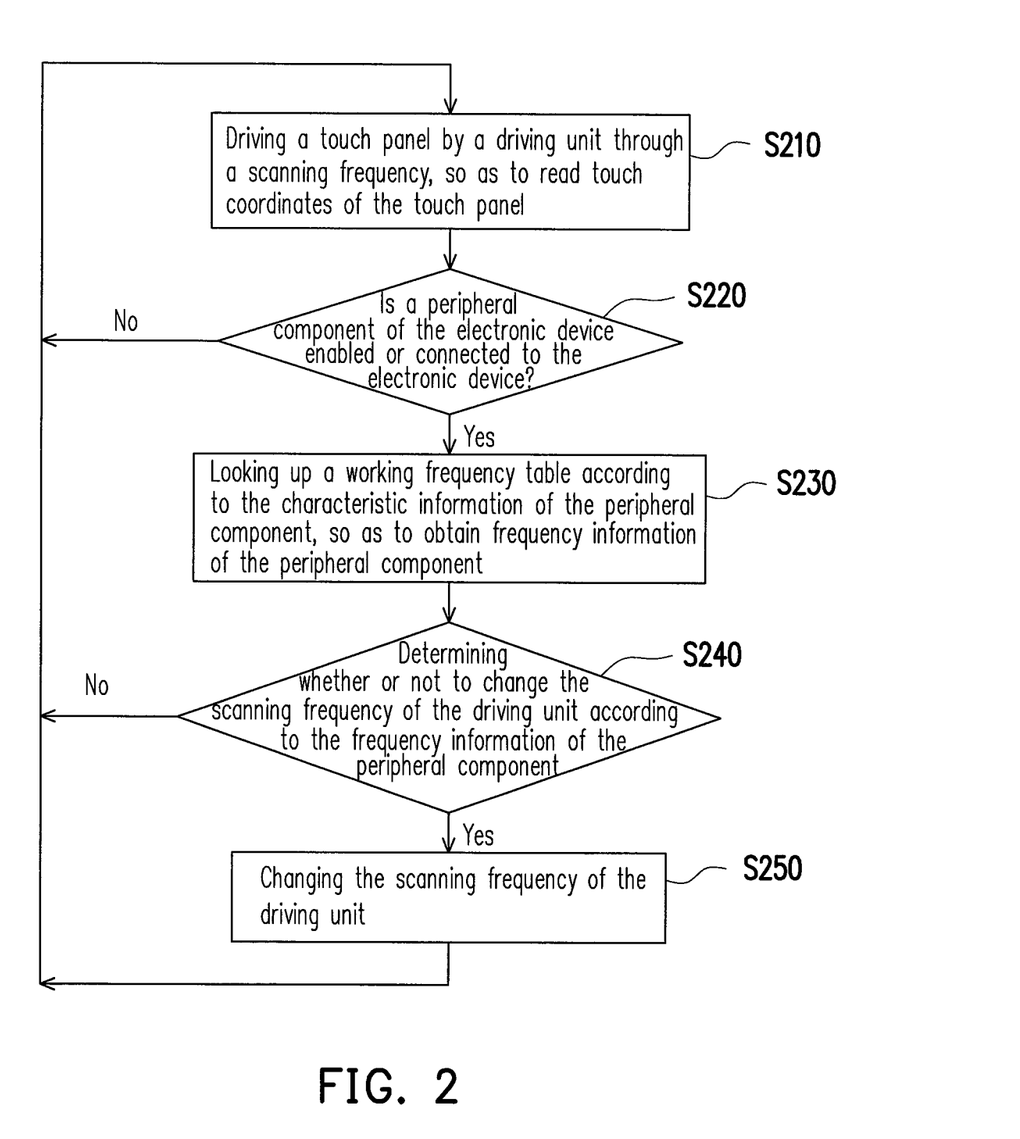
FIG. 2 is a flowchart illustrating a method for operating a touch panel of an electronic device according to an exemplary embodiment of the invention.

In order to further describe the operation method of the electronic device of the invention, another exemplary embodiment is provided below for descriptions. Referring to FIG. 1 and FIG. 2, FIG. 2 is a flowchart illustrating a method for operating a touch panel of an electronic device according to an exemplary embodiment of the invention.

Referring to FIG. 2, the method for operating the touch panel of the electronic device starts from a step S210. In the step S210, the driving unit 120 drives the touch panel 110 through a scanning frequency, so as to read touch coordinates of the touch panel 110.

It should be noticed that in the present exemplary embodiment, in the initial state after the electronic device is booted, the scanning frequency of the driving unit 120 used in the step S210 is an initial default value. For example, according to the initial setting, the initial default value of the driving unit 120 used for driving the touch panel 110 is 300 kHz (kilohertz).

In step S220, the processing unit 130 determines whether a new peripheral component 170 of the electronic device 100 is enabled or connected to the electronic device 100, for example, the processing unit 130 determines whether the peripheral component 170 is enabled or connected to the electronic device 100 according to a reply signal of the interface circuit 160. If yes, for example, the charger 172 is connected to the electronic device 100 for charging, a step S230 is executed. In the step S230, the processing unit 130 obtains the characteristic information of the peripheral component 170 through the interface circuit 160. In the step S230, the processing unit 130 looks up the working frequency table according to the characteristic information of the peripheral component 170, so as to obtain frequency information of the peripheral component 170. Comparatively, in the step S220, if the processing unit 130 detects that none peripheral component is enabled or connected to the electronic device 100, after the step S220, the driving unit 120 repeatedly executes the step S210.

After the processing unit 130 obtains the frequency information of the peripheral component 170 that is enabled or connected to the electronic device 100, in a step S240, the processing unit 130 determines whether or not to change the scanning frequency of the driving unit 120 according to the frequency information of the new peripheral component 170. In the step S240, if the processing unit 130 determines not to change the preset scanning frequency of the driving unit 120, after the step S240, the driving unit 120 repeatedly executes the step S210.

In the step S240, if the processing unit 130 determines to change the preset scanning frequency of the driving unit 120, for example, the scanning frequency of the driving unit 120 used for driving the touch panel 110 conflicts with the frequency information (working frequency) of the peripheral component 170, the processing unit 130 executes a step S250 to change the scanning frequency of the driving unit 120 used for driving the touch panel 110. For example, it is assumed that the working frequency of the HDMI component 174 is 310 kHz, which is very close to the current working frequency setting value 300 kHz of the driving unit 120 used for driving the touch panel 110, so that the working frequency of the HDMI component 174 may interfere the operation of the driving unit 120 to cause a plenty of noises generated in the sensing results of the touch panel 110, which influences sensing performance of the touch panel 110. Therefore, in the step S240, the processing unit 130 determines to change the scanning frequency of the driving unit 120. The processing unit 130 then executes the step S250 to change the scanning frequency of the driving unit 120 that is used for driving the touch panel 110.

It should be noticed that in the step S220, if the processing unit 130 detects that a plurality of the peripheral components 170 (for example, the charger 172 and the HDMI component 174) area enabled or connected to the electronic device 100, in the step S230, the processing unit 130 simultaneously considers the working frequencies of theses peripheral devices 170.

In the step S250, the processing unit 130 changes the scanning frequency of the driving unit 120. For example, when the working frequency of the connected HDMI component 174 is 310 kHz, the processing unit 130 changes the aforementioned current working frequency setting from 300 kHz to 350 kHz, and then writes the changed working frequency setting (350 kHz) into the driving unit 120.

After the processing unit 130 changes the scanning frequency (the working frequency setting) of the driving unit 120, the driving unit 120 executes the step S210 to change the scanning frequency used for driving the touch panel 110 to the 350 kHz according to the changed working frequency setting. Therefore, after the step S210, the driving unit 120 drives the touch panel 110 through the changed scanning frequency to read the touch coordinates on the touch panel 110.

In the present exemplary embodiment, a corresponding relationship of the changed scanning frequency and the peripheral component 170 is pre-recorded in the working frequency table of the processing unit 130, and such working frequency table is stored in a read-only memory. In other words, the processing unit 130 can quickly obtain frequency variation information of the scanning frequency by looking up the working frequency table according to the component characteristic of the peripheral component 170.

In this way, the processing unit 130 can quickly and easily obtain the scanning frequency different to the working frequency of the peripheral component 170, and ameliorate the problem of noise interference generated due to that the working frequency of the peripheral component 170 is excessively close to the scanning frequency of the driving circuit 120 used for driving the touch panel 110.

Figure 3:
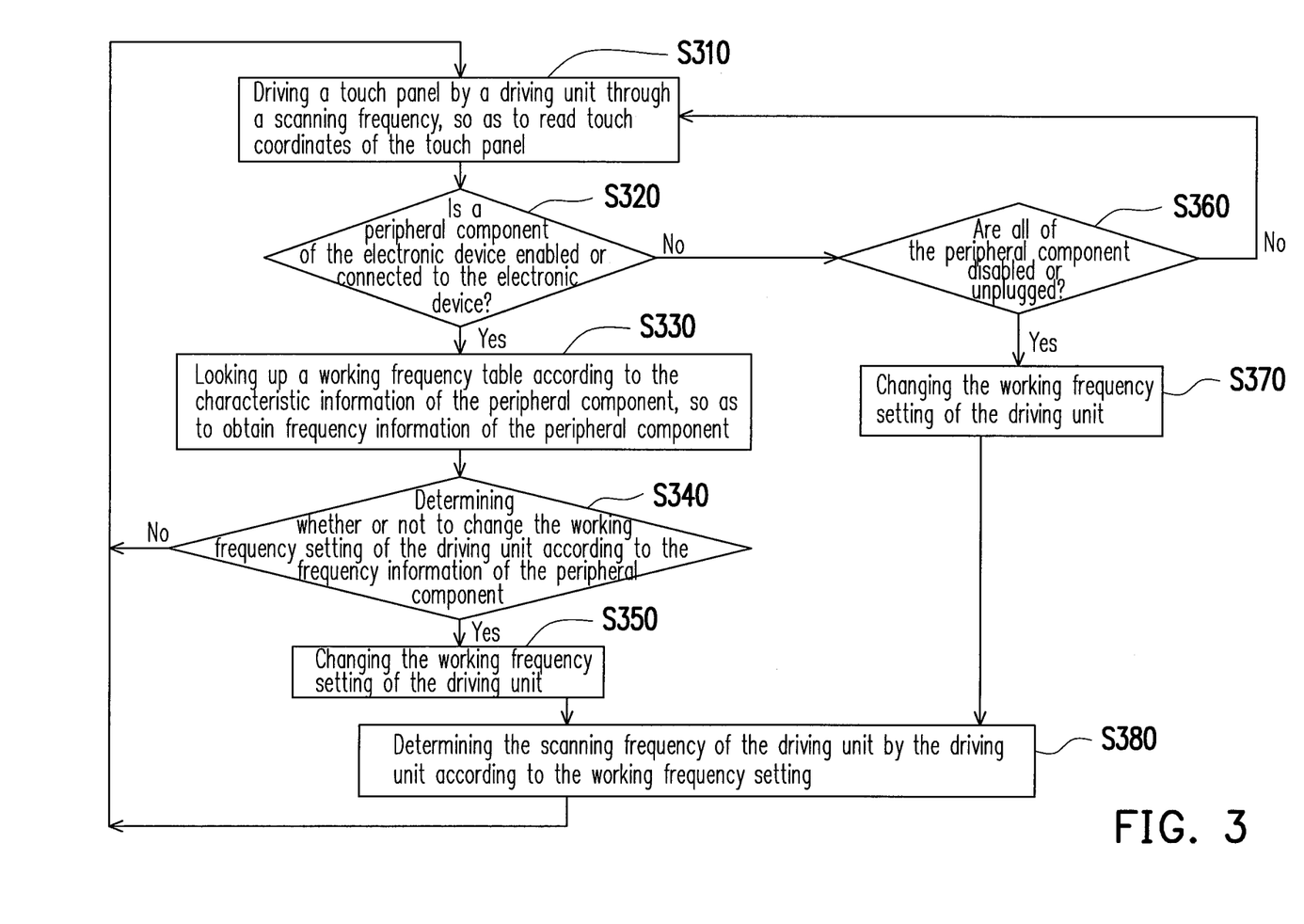
FIG. 3 is a flowchart illustrating a method for operating a touch panel of an electronic device according to another exemplary embodiment of the invention.

However, implementation of the invention is not limited to the above descriptions. Those skilled in the art can suitably modify the content of the aforementioned embodiment according to instructions of the embodiment of the invention and actual product design requirements. For example, in another exemplary embodiment of the invention, the electronic device may further detect whether a peripheral component is disabled or unplugged. When a peripheral component is disabled or unplugged, the driving circuit recovers the changed scanning frequency to the present scanning frequency, so as to recover the scanning performance to a better state. FIG. 3 is a flowchart illustrating a method for operating a touch panel of an electronic device according to another exemplary embodiment of the invention.

The method for operating the touch panel of the electronic device starts from a step S310. Referring to FIG. 1 and FIG. 3, in the step S310, the driving unit 120 drives the touch panel 110 through a scanning frequency, so as to read touch coordinates of the touch panel 110. In the present exemplary embodiment, the driving unit 120 determines the scanning frequency used for driving the touch panel 110 according to the working frequency setting of the driving unit 120. In detail, the driving unit 120 determines the scanning frequency used for driving the touch panel 110 according to the working frequency setting stored in a random access memory. For example, in the electronic device 100, when none peripheral component is enabled, or none peripheral component is connected to the electronic device 100, the processing unit 130 rests the working frequency setting of the driving unit 120 to the initial default value. The driving unit 120 sets the scanning frequency to a present scanning frequency, for example, 300 kHz according to the initial default value. Moreover, the processing unit 130 can dynamically change the working frequency setting of the driving unit 120 according to an actual demand.

In step S320, the processing unit 130 determines whether a new peripheral component 170 is enabled or is connected to the electronic device 100. If yes, after the step S320, the processing unit 130 executes a step S330. In the step S330, the processing unit 130 looks up the working frequency table according to the characteristic information of the peripheral component 170, so as to obtain the frequency information of the peripheral component 170. Then, in step S340, the processing unit 130 determines whether or not to change the working frequency setting of the driving unit 120 according to the frequency information of the peripheral component 170. If the processing unit 130 determines not to change the working frequency setting of the driving unit 120 in the step S340, after the step S340, the driving unit 120 repeatedly executes the step S310.

If the processing unit 130 determines to change the working frequency setting of the driving unit 120 in the step S340, the processing unit 130 executes a step S350. For example, when the scanning frequency of the driving unit 120 conflicts with the frequency information (for example, working frequency) of the peripheral component 170, the processing unit 130 determines to change the scanning frequency of the driving unit 120. For example, assuming the working frequency of the HDMI component 174 of 310 kHz (or a range of the working frequency of the HDMI component 174 of 290 kHz-330 kHz) is obtained in the step S330, since the frequency information of the peripheral component 170 and the scanning frequency (for example, 300 kHz) corresponding to the current working frequency setting of the driving unit 120 are very close (or conflicted), the processing unit 130 determines to change the working frequency setting of the driving unit 120.

If the processing unit 130 determines to change the scanning frequency of the driving unit 120 in the step S340, the processing unit 130 executes the step S350 to change the working frequency setting of the driving unit 120. In step S380, the driving unit 120 can set the scanning frequency used for driving the touch panel 110 to a frequency band (for example, 350 kHz-370 kHz) different to the working frequency (310 kHz) of the peripheral component 170 according to the changed working frequency setting.

In the step S320, if the processing unit 130 determines that none peripheral component 170 is enabled or connected to the electronic device 100, the processing unit 130 executes the step S360. In the step S360, the processing unit 130 determines whether the peripheral components 170 are all disabled or unplugged. For example, the processing unit 130 determines whether the peripheral components 170 are all disabled or unplugged according to reply signals of the interface circuit 160. If a determination result of the step S360 is affirmative, after the step S360, the processing unit 130 executes a step S370 to recover the working frequency setting of the driving unit 120 to the initial default value. If the determination result of the step S360 is negative, it represents that at least one of the peripheral components 170 are enabled or connected to the electronic device, and the driving unit 120 repeatedly executes the step S310.

After the step S370 is completed, the processing unit 130 executes the step S380. In the step S380, the driving unit 120 determines the scanning frequency according to the working frequency setting. For example, the working frequency setting is the initial default value, and the driving unit 120 recovers the scanning frequency used for driving the touch panel 110 to the preset scanning frequency according to the working frequency setting. After the step S380 is completed, the driving unit 120 repeatedly executes the step S310 to read the working frequency setting from the random access memory to set the scanning frequency, so as to drive/scan the touch panel through such scanning frequency to read the touch coordinates of the touch panel 110.

In another exemplary embodiment of the invention, the electronic device further has a learning mechanism. According to the learning mechanism, in case that the working frequency of the peripheral component is not pre-recorded in the working frequency table, a frequency hopping operation method can be used to search the frequency band that is not influenced by the peripheral component, and the frequency band is taken as a usage range of the scanning frequency of the driving circuit of the touch panel, and then the characteristic information of the peripheral component is recorded in the working frequency table for post utilization.

Figure 4:
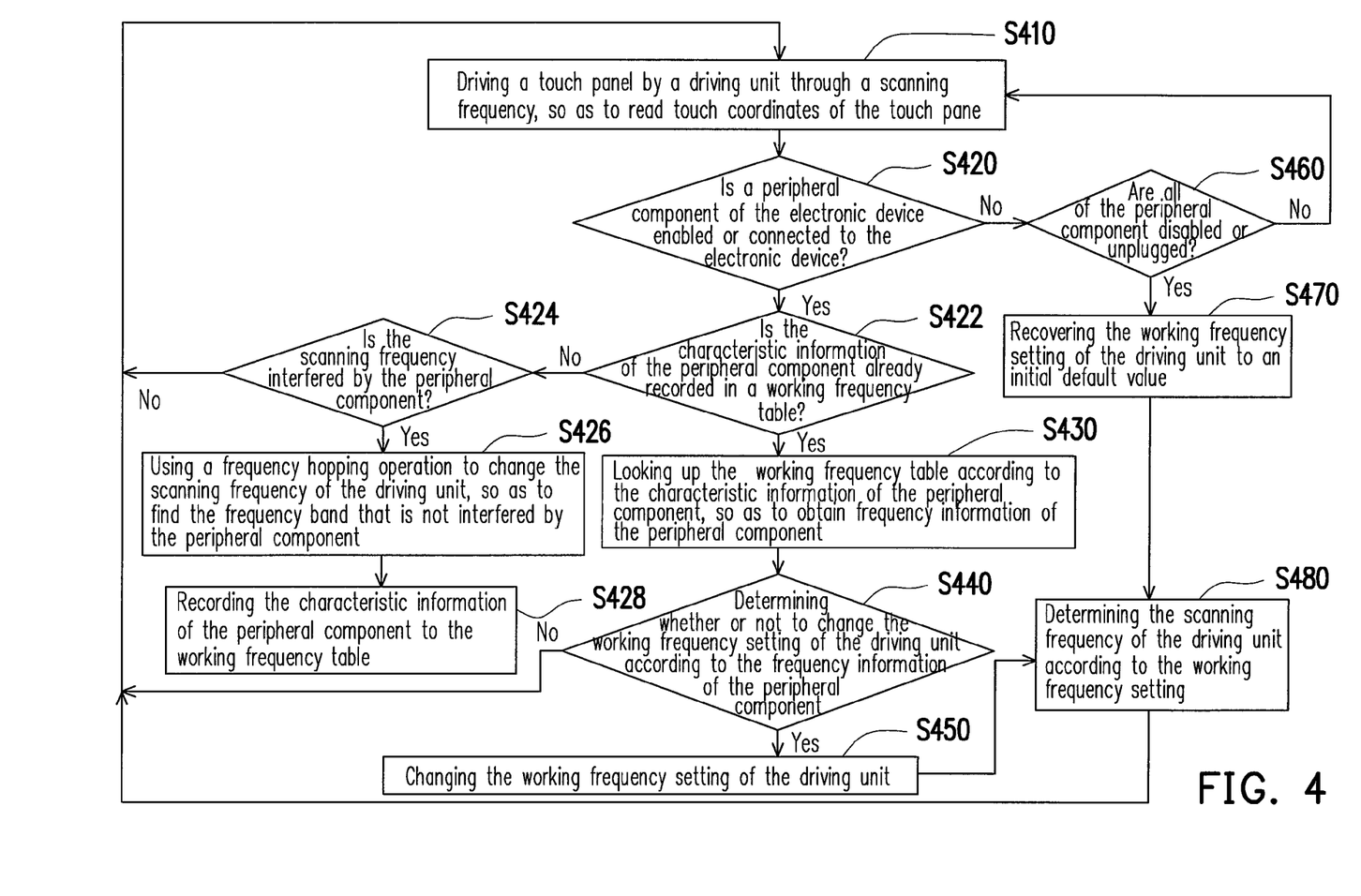
FIG. 4 is a flowchart illustrating a method for operating a touch panel of an electronic device according to still another exemplary embodiment of the invention.

FIG. 4 is a flowchart illustrating a method for operating a touch panel of an electronic device according to still another exemplary embodiment of the invention. It should be noticed that in the present exemplary embodiment, the steps S410, S420 and S430-S480 are respectively similar to the steps S310-S380 of FIG. 3, and only new steps S422-S428 are described in detail below.

Referring to FIG. 1 and FIG. 4, after the processing unit 130 determines that a new peripheral component 170 of the electronic device 100 is enabled or connected to the electronic device 100 in the step S420, the processing unit 130 executes the step S422. In the step S422, the processing unit 130 determines whether the characteristic information of the peripheral component 170 is already recorded in the working frequency table. For example, the processing unit 130 searches the characteristic information of the peripheral component 170 from the working frequency table stored in the read-only memory. If the working frequency table already contains the characteristic information of the peripheral component 170, after the step S422, the processing unit 130 executes the step S430. If the processing unit 130 cannot find the characteristic information of the peripheral component 170 from the working frequency table, the processing unit 130 executes the step S424. In the step S424, the processing unit 130 determines whether the current scanning frequency of the driving unit 120 is interfered by the peripheral component 170. For example, whether the scanning frequency of the driving unit 120 is overlapped to the working frequency of the peripheral component 170 is taken as a determination criterion, and if the frequencies are overlapped, the determination result of the step S424 is affirmative. If the determination result of the step S424 is negative, for example, the scanning frequency of the driving unit 120 does not conflicts with the working frequency of the peripheral component 170, after the step S424, the driving unit 120 repeatedly executes the step S410. If the determination result of the step S424 is affirmative, the processing unit 130 executes the step S426.

In the step S426, the processing unit 130 uses the frequency hopping operation to change the scanning frequency of the driving unit 120, so as to find the frequency band that is not interfered by the peripheral component 170. For example, the scanning frequency of the driving unit 120 is gradually decreased from 148 kHz (the preset scanning frequency) by 1.6 kHz each time until a difference between the scanning frequency of the driving unit 120 and the working frequency of the peripheral component 170 is enlarged to a frequency range in which the frequencies are not mutually interfered (acceptable noise interference). In other embodiments of the invention, the processing unit 130 can set a corresponding difference of the frequency range for different peripheral components 170 according to actual requirements.

After the processing unit 130 finds the frequency band that is not interfered by the peripheral component 170, the processing unit 130 executes the step S428. In the step S428, the processing unit 130 records the characteristic information of the peripheral component 170 to the working frequency table. Taking the HDMI component 174 as an example, the processing unit 130 writs the characteristic information of the HDMI component 174 to the working frequency table in the read-only memory, where the characteristic information of the HDMI component 174, for example, includes the working frequency value 310 kHz of the HDMI component 174.

In this way, when the HDMI component 174 is again enabled or is coupled to the electronic device 100, the processing unit 130 can directly find the component characteristic of the HDMI component 174 through the working frequency table without again using the frequency hopping operation method to search the scanning frequency (or frequency band) of the driving unit 120 that is not interfered by the noise of the HDMI component 174. Therefore, the invention can greatly enhance the efficiency that the processing unit 130 selects the scanning frequency of the driving unit 120 used for driving the touch panel 110.

It should be noticed that those skilled in the art can learn enough instructions and recommendations from the descriptions of the above embodiments for the aforementioned method, and details thereof are not repeated.

In summary, in the embodiments of the invention, the processing unit can look up the working frequency table to obtain the characteristic information corresponding to each of the peripheral components, and obtain the frequency information of the peripheral component according to the characteristic information. In this way, the electronic device can quickly find the scanning frequency for the touch panel that is not interfered by the peripheral device.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. An electronic device, comprising:
    a touch panel;
    a driving unit, coupled to the touch panel, and driving the touch panel through a scanning frequency, so as to read touch coordinates of the touch panel; and
    a processing unit, coupled to the driving unit, wherein the processing unit looks up a working frequency table according to characteristic information of the peripheral component, so as to obtain frequency information of the peripheral component, and determines whether or not to change the scanning frequency of the driving unit according to the frequency information of the peripheral component when a peripheral component of the electronic device is enabled or connected to the electronic device,
    wherein if the frequency information of the peripheral component is not recorded in the working frequency table, the processing unit changes the scanning frequency of the driving unit through a frequency hopping operation to find a frequency band that is not interfered by the peripheral component.

2. The electronic device as claimed in claim 1, wherein the driving unit determines the scanning frequency according to a working frequency setting, and the processing unit determines whether or not to change the working frequency setting of the driving unit according to the frequency information of the peripheral component.

3. The electronic device as claimed in claim 2, wherein the processing unit recovers the working frequency setting to an initial default value when the peripheral component is disabled or unplugged.

4. The electronic device as claimed in claim 1, wherein when the scanning frequency of the driving unit conflicts with the frequency information of the peripheral component, the processing unit changes the scanning frequency of the driving unit.

5. The electronic device as claimed in claim 1, wherein the peripheral component comprises a charger or a high-definition multimedia interface (HDMI) component.

6. The electronic device as claimed in claim 1, wherein the processing unit records the characteristic information of the peripheral component into the working frequency table when the characteristic information of the peripheral component is not recorded in the working frequency table, and the scanning frequency of the driving unit is interfered by the peripheral component.

7. A method for operating a touch panel of an electronic device, comprising:
    driving the touch panel by a driving unit through a scanning frequency, so as to read touch coordinates of the touch panel;
    looking up a working frequency table according to characteristic information of a peripheral component of the electronic device, so as to obtain frequency information of the peripheral component when the peripheral component of the electronic device is enabled or connected to the electronic device;

determining whether or not to change the scanning frequency of the driving unit according to the frequency information of the peripheral component; and changing the scanning frequency of the driving unit through a frequency hopping operation to find a frequency band that is not interfered by the peripheral component if the frequency information of the peripheral component is not recorded in the working frequency table.

8. The method for operating the touch panel of the electronic device as claimed in claim 7, further comprising:

determining whether or not to change a working frequency setting of the driving unit according to the frequency information of the peripheral component; and determining the scanning frequency of the driving unit according to the working frequency setting.

9. The method for operating the touch panel of the electronic device as claimed in claim 8, further comprising:

recovering the working frequency setting to an initial default value when the peripheral component is disabled or unplugged.

10. The method for operating the touch panel of the electronic device as claimed in claim 7, wherein the step of determining whether or not to change the scanning frequency of the driving unit comprises:

changing the scanning frequency of the driving unit when the scanning frequency of the driving unit conflicts with the frequency information of the peripheral component.

11. The method for operating the touch panel of the electronic device as claimed in claim 7, wherein the peripheral component comprises a charger or a high-definition multimedia interface (HDMI) component.

12. The method for operating the touch panel of the electronic device as claimed in claim 7, further comprising:

recording the characteristic information of the peripheral component in the working frequency table when the characteristic information of the peripheral component is not recorded in the working frequency table and the scanning frequency of the driving unit is interfered by the peripheral component.

* * * * *